(12) United States Patent
Liu et al.

(10) Patent No.: US 12,399,389 B2
(45) Date of Patent: Aug. 26, 2025

(54) USER WEARABLE OPTICAL ARTICLE, METHOD FOR PRODUCING AND EYEWEAR USING THE SAME

(71) Applicant: ESSILOR INTERNATIONAL, Charenton-le-Pont (FR)

(72) Inventors: Yu Liu, Singapore (SG); Chit Yaw Fu, Singapore (SG); Yassine Fakhreddine, Singapore (SG); Xingzhao Ding, Singapore (SG)

(73) Assignee: Essilor International, Charenton-le-pont (FR)

( * ) Notice: Subject to any disclaimer, the term of this patent is extended or adjusted under 35 U.S.C. 154(b) by 848 days.

(21) Appl. No.: 17/633,066

(22) PCT Filed: Aug. 5, 2020

(86) PCT No.: PCT/EP2020/072009
§ 371 (c)(1),
(2) Date: Feb. 4, 2022

(87) PCT Pub. No.: WO2021/023774
PCT Pub. Date: Feb. 11, 2021

(65) Prior Publication Data
US 2022/0269111 A1 Aug. 25, 2022

(30) Foreign Application Priority Data
Aug. 8, 2019 (EP) .................................... 19315088

(51) Int. Cl.
*G02C 7/10* (2006.01)
*G02B 5/28* (2006.01)
*G02C 7/02* (2006.01)

(52) U.S. Cl.
CPC ............. *G02C 7/107* (2013.01); *G02B 5/282* (2013.01); *G02C 7/02* (2013.01); *G02C 2202/24* (2013.01)

(58) Field of Classification Search
CPC ...... G02C 7/107; G02C 7/02; G02C 2202/24; G02C 7/104; G02B 5/282; G02B 5/285
See application file for complete search history.

(56) References Cited

U.S. PATENT DOCUMENTS 4,556,599 A 12/1985 Sato et al.
4,793,669 A * 12/1988 Perilloux .............. G02B 5/282
359/359

(Continued)

FOREIGN PATENT DOCUMENTS

CN 109073785 A 12/2018
EP 3 282 292 2/2018

(Continued)

OTHER PUBLICATIONS

International Search Report for PCT/EP2020/072009, mailed Oct. 27, 2020, 4 pages.

(Continued)

*Primary Examiner* — Wyatt A Stoffa
*Assistant Examiner* — Ray Alexander Dean
(74) *Attorney, Agent, or Firm* — NIXON & VANDERHYE

(57) ABSTRACT

Disclosed is a user wearable optical article including an optical substrate and an interferential coating. The interferential coating may be disposed the substrate and may be configured to selectively reflect light of at least one range of wavelengths of an incident light in the near infrared light spectrum. A peak reflectance measured at a substantially normal to the optical article may be at least 70%. An eyewear including an optical article and a method for (Continued)

producing an optical article are also disclosed. The method may include providing the optical substrate and providing the interferential coating disposed on the optical substrate. The interferential coating may selectively reflect light of at least one range of wavelengths of an incident light in the near infrared light spectrum. A peak reflectance may be at least 70% and the interferential coating has a mean reflectance of less than 1.5% in a visible light range.

19 Claims, 9 Drawing Sheets

(56) References Cited

U.S. PATENT DOCUMENTS

| | | | |
|---|---|---|---|
| 2004/0240093 A1* | 12/2004 | Yoshikawa | G02B 5/282 359/883 |
| 2010/0182678 A1* | 7/2010 | Southwell | G02B 5/22 359/359 |
| 2015/0146161 A1 | 5/2015 | Rigato | |
| 2018/0196285 A1 | 7/2018 | Rigato et al. | |
| 2019/0137660 A1 | 5/2019 | Ding | |
| 2019/0171039 A1 | 6/2019 | Ding | |

FOREIGN PATENT DOCUMENTS

| | | | | |
|---|---|---|---|---|
| EP | 3282292 A1 | * | 2/2018 | G02B 1/115 |
| KR | 20180039610 A | * | 4/2018 | |

OTHER PUBLICATIONS

Written Opinion of the ISA for PCT/EP2020/072009, mailed Oct. 27, 2020, 7 pages.

Office Action, issued in Chinese Patent Application No. 202080051912.5 dated Dec. 26, 2023.

* cited by examiner

USER WEARABLE OPTICAL ARTICLE, METHOD FOR PRODUCING AND EYEWEAR USING THE SAME

This application is the U.S. national phase of International Application No. PCT/EP2020/072009 filed Aug. 5, 2020 which designated the U.S. and claims priority to 19315088.5 filed Aug. 8, 2019, the entire contents of each of which are hereby incorporated by reference.

TECHNICAL FIELD

This disclosure relates to an optical article, a method for producing the optical article and an eyewear using the same.

BACKGROUND

It is estimated that about 60% of the world wide population uses spectacles for some sort of vision correction. This number is much higher if contact lenses and spectacles which do not primarily have a correction function are also considered, for example, safety spectacles, sunglasses, and swimming goggles. Most spectacles have some sort of frame to hold a pair of lenses in place, so that when the frame is rested on facial features (e.g. nose and ears), the lenses are placed in front to the eyes. Most types of known spectacles adjust the light and/or image to be received by an observer wearing the spectacles, and may further have aesthetical and ergonomic features.

Today, digital devices have become part of everyone's daily life, bringing a lot of convenience and benefits for the users. However, there are also certain risks associated with the use of digital devices, e.g. eye fatigue, deterioration of vision, etc. Actually, many parents believe that inappropriate usage of digital devices would cause myopia progression, or early onset of myopia, for their kids. Many people may require lenses for correcting myopia or to control progression of myopia.

Thus, there is a need to provide for means for reducing myopia onset and/or controlling progression.

Today, most digital multi-function devices (e.g., smartphones, tablets) already have their built-in proximity sensors. Such proximity sensors emit infrared light and by measuring the reflected infrared light from an object, the distance between the proximity sensor and the object can be determined. The most common use of this function is to determine whether a phone is placed near the user's ear during a phone call. In this situation, the proximity sensor may activate a background application which will turn off the digital screen in order to avoid undesirable operations from accidental touch on the screen.

The present invention intends to provide a user wearable optical articles with a interferential coating to enhance the reflection of a NIR signal reflected by the user wearable optical article, thus the user wearable optical article may be used in connection with a digital screen to indicate the distance between the screen and the user wearable optical article, and therefore the distance between the digital screen and user's eye(s). Such distance may be used to alert the user that his reading distance is not within an optimal or healthy range.

In order to achieve high reflection of NIR radiation, various solutions have been proposed in the prior art. One known prior-art solution, as presented in documents U.S. Pat. No. 4,793,669A, US2004/240093A1 and U.S. Pat. No. 4,556,599A, is the multilayer (usually more than 10 layers) quarter-wave reflection stacks, consisting of alternative high index and low index layers. As implied by the name, optical thickness of each layer in such stacks is $\lambda/4$ except the outmost low index layer being $\lambda/8$, where $\lambda$ is the targeted center-wavelength of the reflection band. Sometimes such quarter-wave stacks also start with a $\lambda/8$ inner-most low index layer. FIGS. 3-8 of the present invention also depict some examples of such quarter-wave reflection stacks. The peak position of the reflection band can be easily adjusted by changing the value of center-wavelength $\lambda$. The maximum reflectance of such coatings increases with increasing the number of quarter-wave layers in the stacks, and can even approach 100% if there are sufficient number of layers. However, in order to have a sufficient reflectance (e.g. >70% at 940 nm or 850 nm), the overall thickness of the quarter-wave reflection stacks is very thick, typically $\geq 1000$ nm, which is not applicable for common organic substrates used for the user wearable optical article. Moreover, the reflectance value (Rv) of these quarter-wave reflection stacks is typically around 2% or higher.

Another prior-art solution for achieving high NIR reflection is by the general interferential multilayer stacks, in which optical thickness of all layers can be very different from each other, no longer limited to $\lambda/4$. Documents EP3282292A1 and US2018/196285A1 for example disclose some multilayer interferential AR stacks with high NIR reflection. The AR stacks designing strategy in these documents is to maximize mean reflection in NIR region ($R_m^{NIR}$) from 780 to 1400 nm while keeping anti-reflective effect in visible light region. Under such designing strategy, it is hard to achieve high reflectance (~70%) at a specific interesting wavelength, e.g. 940 nm or 850 nm, with a restriction of total thickness of the AR stacks (e.g. <800 nm). The reflection at the interesting wavelength, 940 nm or 850 nm, of all the example AR stacks in those documents is less than 45%.

SUMMARY

It's an objective of the invention to address the above problems.

A first aspect of the disclosure concerns a user wearable optical article. The user wearable optical article, also named herein as optical article for simplicity, may include an optical substrate and an interferential coating. The optical substrate may have a front main face and a rear main face on opposite sides, wherein the front main face is for facing the user when wearing the optical article. The interferential coating may be disposed on at least one of the front main face and rear main face and may be configured to selectively reflect light of at least one range of wavelengths of an incident light in the near infrared light spectrum. A peak reflectance measured at 850 nm or 940 nm at a substantially normal to the optical article may be at least 70%.

According to various embodiments, the interferential coating may have a mean reflectance of less than 1.5% in a visible light range.

According to various embodiments, the interferential coating may include at least two low refractive index layers and at least two high refractive index layers, wherein the low refractive index layers and the high refractive index layers are in an alternating sequence, for example as a stack of layers. The low refractive index layers may be layers of low refractive index material. The high refractive index layers may be layers of high refractive index material. The low refractive index layers may have a refractive index lower than the high refractive index layers. Each of the low refractive index layers may have a refractive index lower than 1.60 and each of the high refractive index layers may have a refractive index higher than 1.80.

According to various embodiments, the stack of layers may be, for example, a quarter wavelength stack also named herein as quarter wave interferential coating, or an anti-reflection (AR) stack also named herein as anti-reflection interferential coating. Anti-reflection may mean reducing reflection in at least a portion of the visible spectrum, for example in the whole visible spectrum. The stacks are optimized for enhanced reflection in the near infra-red.

According to various embodiments, the ratio of a highest refractive index amongst the high refractive index layers to a lowest refractive index amongst the low refractive index layers may be greater than 1.30, for example greater than 1.40.

According to various embodiments, the low refractive index layers may have a low refractive index material composition of a first refractive index and a first thickness, and the high refractive index layers may have a high refractive index material composition of a second refractive index different from the first refractive index and a second thickness different from the first thickness.

According to various embodiments, the interferential coating may include low refractive index layers and high refractive index layers in an alternating sequence. The optical thickness of each layer of the low refractive index layers may equal to a quarter of a targeted center reflection wavelength. The optical thickness of each layer of the high refractive index layers may equal to a quarter of a targeted center reflection wavelength. The interferential coating may include an outer high refractive index layer, which is furthest from the optical substrate amongst the high refractive index layers. The interferential coating may further include an outer low refractive index layer which is disposed on the outer high refractive index layer on a side which is distal from the optical substrate. The outer low refractive index layer may have an optical thickness equal to one-eighth of the targeted wavelength.

According to various embodiments, the multilayered interferential coating may include at least 8 layers.

According to various embodiments, a reflectance of the interferential coating at 850 nm and/or a reflectance of the interferential coating at 940 nm is at least 70%, for example at least 80%.

According to various embodiments, the peak reflectance of the optical filter is at 850 nm+/−10 nm or at 940 nm+/−10 nm.

According to various embodiments, the optical article may be an article selected from the group of: spectacle lens, sunglasses lens, contact lens, optical lens of a head mounted device, optical lens of an augmented reality device, optical lens of a virtual reality device.

According to various embodiments, the optical filter may have a reflectance value (Rv) equal or lower than 1.5%, for example equal or lower than 0.5%, for example equal or lower than 0.1%.

According to various embodiments the optical article may be for use in the prevention or treatment of asthenopia and/or myopia.

A second aspect of the disclosure concerns an eyewear including an optical article according to various embodiments.

A third aspect of the disclosure concerns a method for producing an optical article. The method may include providing the optical substrate. The method may further include providing the interferential coating disposed on at least one of the front main face and rear main face of the optical substrate. The interferential coating may be configured to selectively reflect light of at least one range of wavelengths of an incident light in the near infrared light spectrum. A peak reflectance measured at 850 nm or 940 nm at a substantially normal to the optical substrate may be at least 70%.

According to various embodiments the method may further include obtaining a product model designation of a multi-purpose mobile computing device (for example a smartphone) including an infrared proximity sensor. The method may further include obtaining from a pre-populated database an operating wavelength of the infrared proximity sensor, or a value derived thereof. In the method, the providing the interferential coating may include providing the at least one range of wavelengths of incident light in the near infrared light spectrum to overlap with the operating wavelength of the infrared proximity sensor.

BRIEF DESCRIPTION OF THE DRAWINGS

Embodiments of the invention will now be described, by way of example, and with reference to the following drawings in which.

Figure 1:
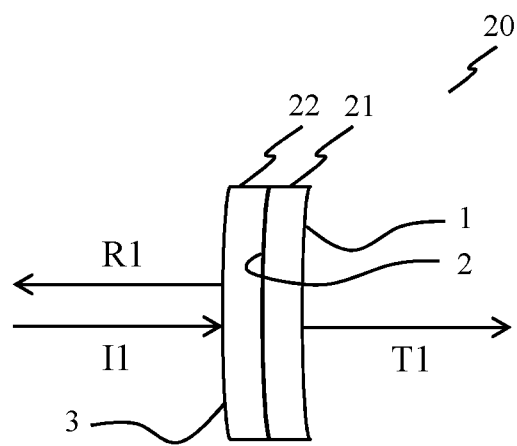
FIG. 1 shows a schematic illustration of a user wearable optical article 20 including an optical substrate 21 and an interferential coating 22, in accordance with various embodiments.

The figures are of schematic nature and elements therein may be of different scale or positioned differently to improve readability.

DETAILED DESCRIPTION

In the description, which follows, the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may be embodied in a wide variety of contexts. Embodiments discussed herein are merely representative and not limiting.

Various embodiments disclosed herein relate to the various aspects of the disclosure such as a system, a method of operating the system, a computer program product, and a computing device. Embodiments and explanations thereof disclosed in connection with one embodiment may be applicable to other embodiments. For example, embodiments and explanations to the system may be applicable to the method.

The term "user wearable optical article" or simply "optical article", as used herein, and in accordance with various embodiments, may refer to an optical article configured to be worn by a user, for example, in front of a user's eye. For example, the user wearable optical article may be selected from the group of: spectacle lens, sunglasses lens, contact lens, optical lens of a head mounted device, optical lens of an augmented reality device, optical lens of a virtual reality device. A "lens", according to various embodiments, may have corrective power or may not have corrective power (e.g. a plano lens).

The term "eyewear", as used herein and according to various embodiments, may refer to an object to be worn on/in relation to the eye, for example spectacles. An eyewear according to various embodiments, may include a user wearable optical article, for example one or more user wearable optical articles. The eyewear may be selected from the group of: spectacles, sunglasses, head mounted device, augmented reality device, virtual reality device.

The expression "visible spectrum", as used herein and according to various embodiments, may be defined as light having wavelength in vacuum from 380 nm to 780 nm.

The expression "near infrared spectrum" (or abbreviated NIR spectrum), as used herein and according to various embodiments, may be defined as light having a wavelength in vacuum longer than 780 nm and shorter or equal to 1400 nm, for example shorter than 1100 nm, optionally from 800 nm to 1000 nm.

According to various embodiments, Rv is described and may be may be determined with the equation below, where $R(\lambda)$ is the reflectance at wavelength of $\lambda$, $V(\lambda)$ is the eye sensitivity function in CIE 1931, and $D65(\lambda)$ is the daylight illuminant defined in standard CIE S005/E-1998.

$$Rv = \frac{\int_{380}^{780} R(\lambda) \cdot V(\lambda) \cdot D_{65}(\lambda) d\lambda}{\int_{380}^{780} V(\lambda) \cdot D_{65}(\lambda) d\lambda}$$

As used herein, the term "and/or" includes any and all combinations of one or more of the associated listed items.

FIG. 1 shows a schematic illustration of a user wearable optical article 20 including an optical substrate 21 and an interferential coating 22, in accordance with various embodiments. The user wearable optical article 20, may include an optical substrate 21 and an interferential coating 22. The optical substrate 21 may have a front main face 1 and a rear main face 2 on opposite sides, wherein the front main face 1 is for facing the user when wearing the optical article 20. The interferential coating 21 may be disposed on at least one of the front main face 1 and rear main face 2 and may be configured to selectively reflect light of at least one range of wavelengths of an incident light I1 in the near infrared light spectrum. A peak reflectance measured at a substantially normal to the optical article may be at least 70%. The expression "substantially normal", as used herein and according to various embodiments, may mean within an angle of 15 degrees from the geometric normal to a surface on which light may be incident, e.g., surface 3 of the user wearable optical article at the point where light I1 is incident.

According to various embodiments, the optical substrate may include, for example, be composed of: transparent materials, transparent mineral glass, transparent organic materials. An organic substrate may include, for example, be composed of: thermoset or thermoplastic materials, for example, commercially available material: Orma, 1.56, MR8, MR7, polycarbonate. Alternatively or in addition to transparent materials, the optical substrate may include, for example, be composed of, tinted materials, for example substrate for sunglasses. The term "transparent" may mean a peak transmittance of at least 95%, preferably at least 98%, in any or all concerned wavelengths, for example in the visible spectrum. In examples, the substrate thickness may be selected from the range of 0.3 mm to 2 mm.

According to various embodiments, the interferential coating may include at least two low refractive index layers and at least two high refractive index layers, wherein the low refractive index layers and the high refractive index layers are in an alternating sequence. The low refractive index layers may be layers of low refractive index material. The high refractive index layers may be layers of high refractive index material. The low refractive index layers may have a refractive index lower than the high refractive index layers.

Figure 2:
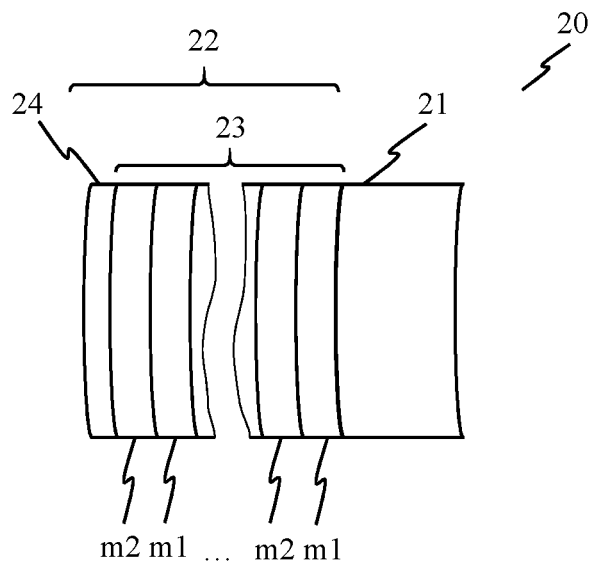
FIG. 2 shows details of an exemplary interferential coating 22 on a substrate 21, in accordance with some embodiments.

An exemplary interferential coating 22 on an optical substrate 21 is schematically illustrated in FIG. 2. According to various embodiments, the interferential coating may include low refractive index layers m1 and high refractive index layers m2 in an alternating sequence forming a stack. The interferential coating 22 of FIG. 2 includes low refractive index layers m1 and high refractive index layers m2, which form a stack 23. Except for the first and last layers of the stack, each of the low refractive index layers m1 may be in contact with two high refractive index layers m2 and vice-versa. The optical thickness of each layer of the low refractive index layers m1 may equal to a quarter of a targeted center reflection wavelength. The optical thickness of each layer of the high refractive index layers m2 may equal to a quarter of a targeted center reflection wavelength. The interferential coating 22 may include an outer low refractive index layer 24 which is disposed on the outer high refractive index layer on a side which is distal from the optical substrate 21. The outer low refractive index layer 24 may have an optical thickness equal to one-eighth of the targeted wavelength. The outer low refractive index layer 24, may be configured to, for example, optically interface the stack 23 with air.

In some embodiments, the low refractive index layers may have a low refractive index material composition of a first refractive index and a first thickness, and the high refractive index layers may have a high refractive index material composition of a second refractive index different from the first refractive index and a second thickness different from the first thickness. For example, each of the low refractive index layers may have the low refractive index material composition of the first refractive index and may have the first thickness; each of the high refractive index layers may have the high refractive index material composition of the second refractive index and may have the second thickness.

Each of the low refractive index layers may have a refractive index lower than 1.60 and each of the high refractive index layers may have a refractive index higher than 1.80. Low refractive index layers may include or be formed of: $SiO_2$, SiO2-AlO3 composite with less than 20 mol % of $Al_2O_3$, $MgF_2$, and their mixtured. High refractive index layers may include or be formed of: SiN, $TiO_2$, $Nb_2O_5$, $ZrO_2$, $Ta_2O_5$, $Nd_2O_3$, $Pr_2O_3$, $PrTiO_3$, $La_2O_3$, and their mixtures. According to various embodiments, the refractive index of a material, if not otherwise defined, refers to the refractive index of the material in vacuum at the wavelength of 550 nm.

FIGS. 3 to 8 show examples of interferential coatings according to some embodiments including quarter wavelength stacks.

Figure 3:
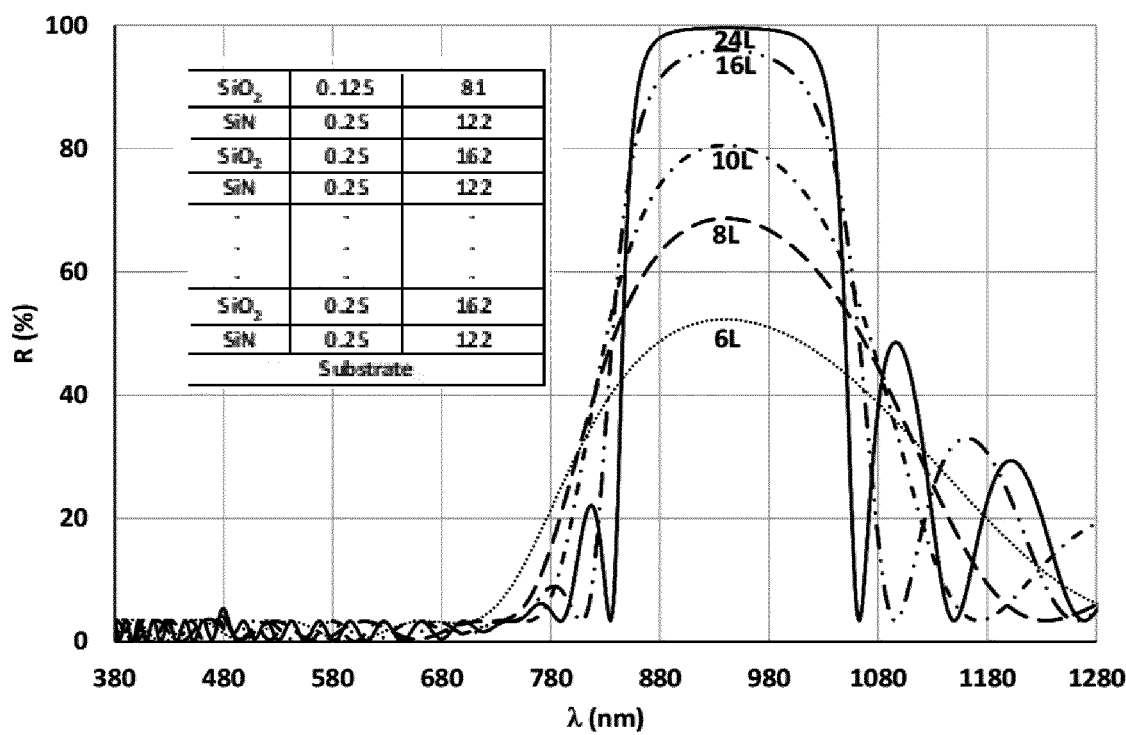
FIGS. 3 to 8 show examples of interferential coatings according to some embodiments including quarter wavelength stacks.

FIG. 3 shows a table with a layer configuration of an interferential coating optimized for 940 nm, the columns from left to right represent: material composition, optical thickness in wavelengths of 940 nm, and physical thickness in nanometers (nm). In FIG. 3, the interferential coating includes a stack of alternated $SiO_2$ as low refractive index layers and SiN layers as high refractive index layers. The optical thickness of each of the low refractive index layers and the high refractive index layers is 0.25. The physical thickness of each of the low refractive index layers is 162 nm, and the physical thickness of each of the high refractive index layers is 122 nm. The interferential coating further includes an outer low refractive index layer (first line of the table) of $SiO_2$ with optical thickness of 0.125 and physical thickness of 81 nm. FIG. 3 also shows reflectance plots as function of the wavelength for the interference coatings with a stack varying from 6 layers (6L), 8 layers, 10 layers, 16 layers, and 24 layers (24L). The number of layers increases from bottom up. As can be seen, with the exemplary configuration of FIG. 3, a stack of 10 or more layers provides a peak reflectance measured at a substantially normal to the optical article is at least 70%.

Figure 4:
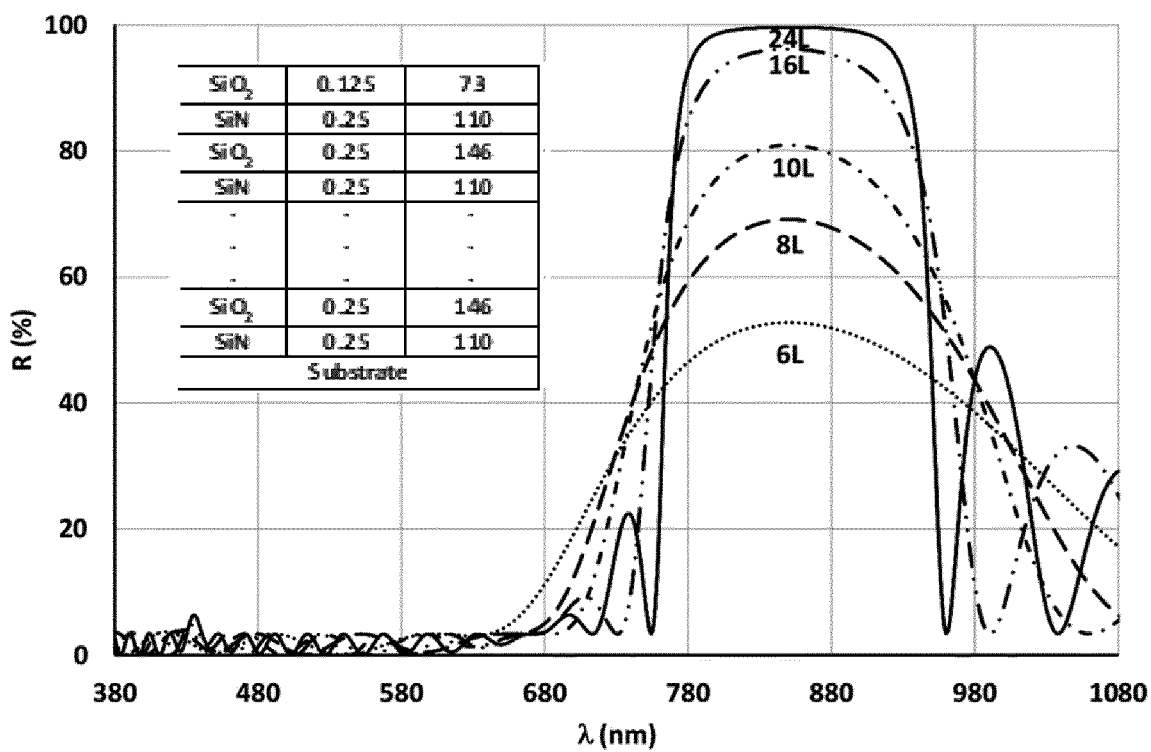

FIG. 4 shows another table with a layer configuration of an interferential coating optimized for 850 nm, the columns from left to right represent: material composition, optical thickness in wavelengths of 850 nm, and physical thickness in nanometers (nm). In FIG. 4, the interferential coating includes a stack of alternated $SiO_2$ as low refractive index layers and SiN layers as high refractive index layers. The optical thickness of each of the low refractive index layers and the high refractive index layers is 0.25. The physical thickness of each of the low refractive index layers is 110 nm, and the physical thickness of each of the high refractive index layers is 146 nm. The interferential coating further includes an outer low refractive index layer (first line of the table) of $SiO_2$ with optical thickness of 0.125 and physical thickness of 73 nm. FIG. 4 also shows reflectance plots as function of the wavelength for the interference coatings with a stack varying from 6 layers (6L), 8 layers, 10 layers, 16 layers, and 24 layers (24L). The number of layers increases from bottom up. As can be seen, with the exemplary configuration of FIG. 4, a stack of 10 or more layers provides a peak reflectance measured at a substantially normal to the optical article is at least 70%.

FIGS. 3 and 4 show the structure and reflection spectra of $SiN/SiO_2$ quarter-wavelength reflection filters. It is noted that reflectance at 940 nm or 850 nm of these reflection filter increases gradually with increasing the number of layers of the stacks, while the mean reflectance in visible region changes little, with Rv remaining at around 2%. With about 24 layers (12 layers of SiN and 12 layers $SiO_2$), about 100% reflectance at 940 nm or 850 nm can be achieved.

Figure 5:
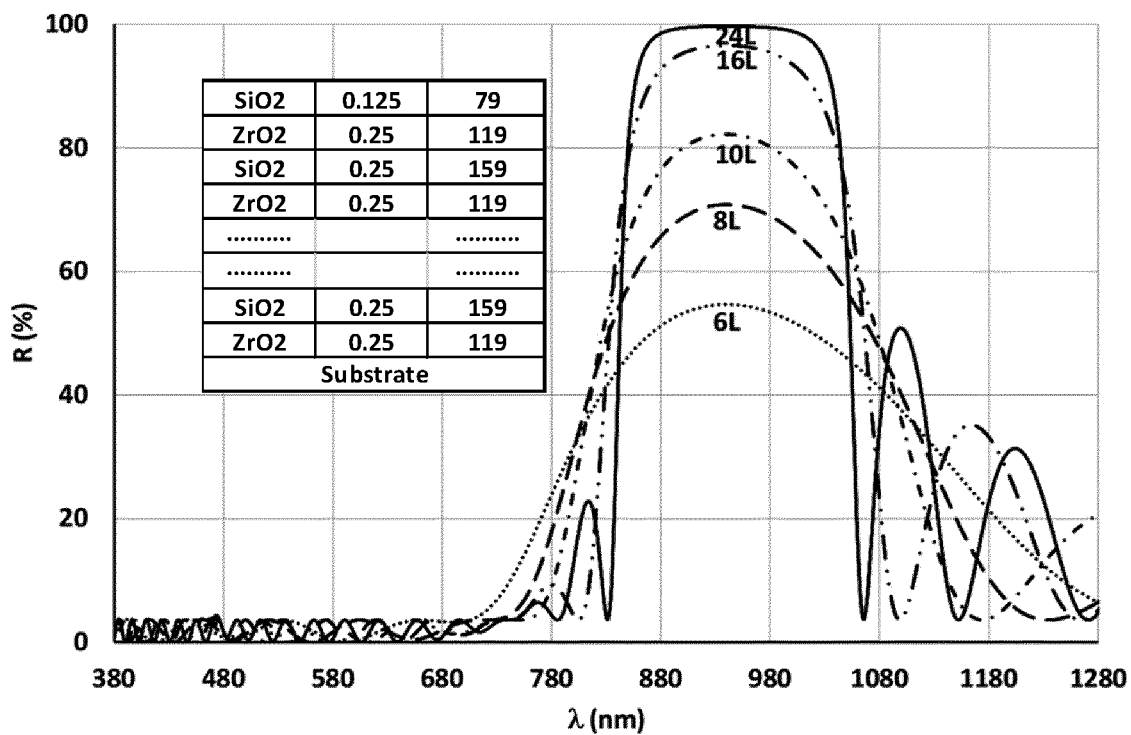

FIG. 5 shows another table with a layer configuration of an interferential coating optimized for 940 nm, the columns from left to right represent: material composition, optical thickness in wavelengths of 940 nm, and physical thickness in nanometers (nm). In FIG. 5, the interferential coating includes a stack of alternated $SiO_2$ as low refractive index layers and $ZrO_2$ layers as high refractive index layers. The optical thickness of each of the low refractive index layers and the high refractive index layers is 0.25. The physical thickness of each of the low refractive index layers is 159 nm, and the physical thickness of each of the high refractive index layers is 119 nm. The interferential coating further includes an outer low refractive index layer (first line of the table) of $SiO_2$ with optical thickness of 0.125 and physical thickness of 79 nm. FIG. 5 also shows reflectance plots as function of the wavelength for the interference coatings with a stack varying from 6 layers (6L), 8 layers, 10 layers, 16 layers, and 24 layers (24L). The number of layers increases from bottom up. As can be seen, with the exemplary configuration of FIG. 5, a stack of 8 or more layers provides a peak reflectance measured at a substantially normal to the optical article is at least 70%.

Figure 6:
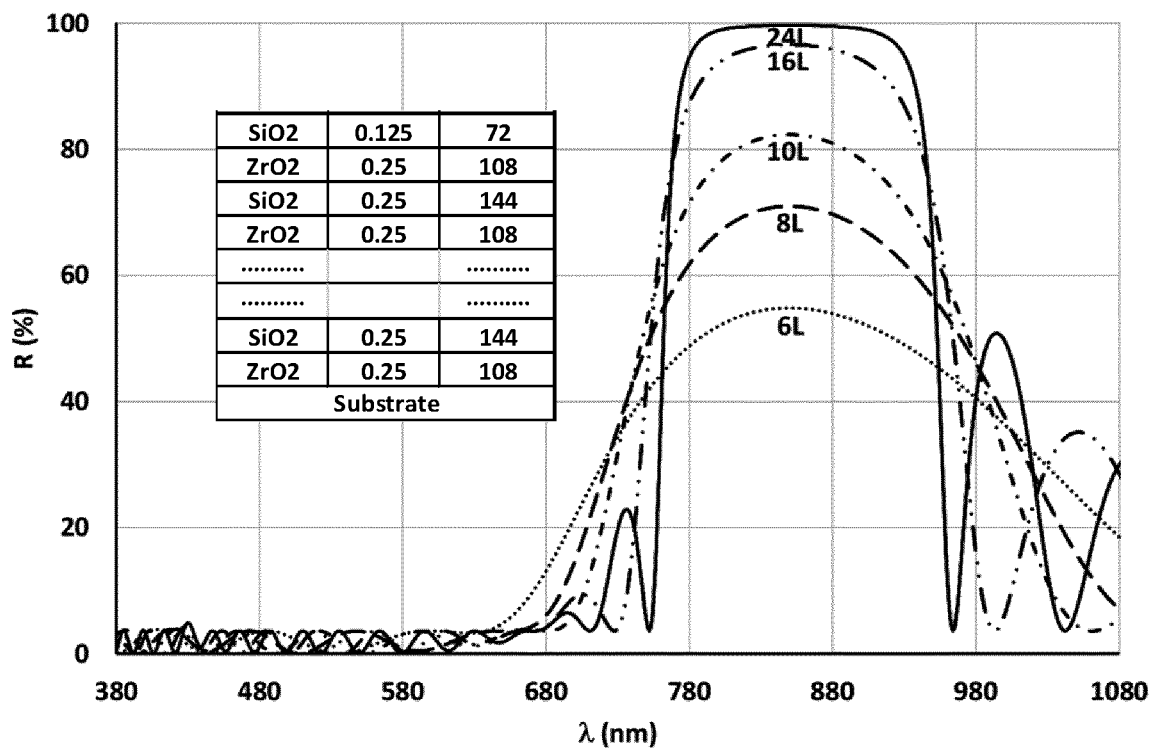

FIG. 6 shows another table with a layer configuration of an interferential coating optimized for 850 nm, the columns from left to right represent: material composition, optical thickness in wavelengths of 850 nm, and physical thickness in nanometers (nm). In FIG. 6, the interferential coating includes a stack of alternated $SiO_2$ as low refractive index layers and $ZrO_2$ layers as high refractive index layers. The optical thickness of each of the low refractive index layers and the high refractive index layers is 0.25. The physical thickness of each of the low refractive index layers is 144 nm, and the physical thickness of each of the high refractive index layers is 108 nm. The interferential coating further includes an outer low refractive index layer (first line of the table) of $SiO_2$ with optical thickness of 0.125 and physical thickness of 72 nm. FIG. 6 also shows reflectance plots as function of the wavelength for the interference coatings with a stack varying from 6 layers (6L), 8 layers, 10 layers, 16 layers, and 24 layers (24L). The number of layers increases from bottom up. As can be seen, with the exemplary configuration of FIG. 6, a stack of 8 or more layers provides a peak reflectance measured at a substantially normal to the optical article is at least 70%.

Figure 7:
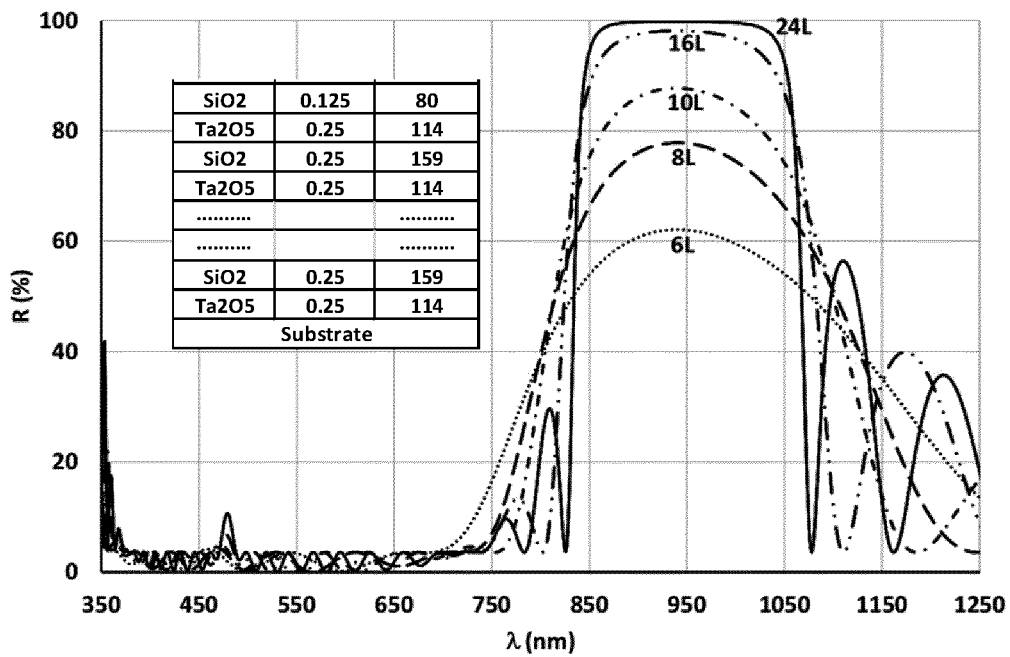

FIG. 7 shows another table with a layer configuration of an interferential coating optimized for 940 nm, the columns from left to right represent: material composition, optical thickness in wavelengths of 940 nm, and physical thickness in nanometers (nm). In FIG. 7, the interferential coating includes a stack of alternated $SiO_2$ as low refractive index layers and $Ta_2O_5$ layers as high refractive index layers. The optical thickness of each of the low refractive index layers and the high refractive index layers is 0.25. The physical thickness of each of the low refractive index layers is 159 nm, and the physical thickness of each of the high refractive index layers is 114 nm. The interferential coating further includes an outer low refractive index layer (first line of the table) of $SiO_2$ with optical thickness of 0.125 and physical thickness of 80 nm. FIG. 7 also shows reflectance plots as function of the wavelength for the interference coatings with a stack varying from 6 layers (6L), 8 layers, 10 layers, 16 layers, and 24 layers (24L). The number of layers increases from bottom up. As can be seen, with the exemplary configuration of FIG. 7, a stack of 8 or more layers provides a peak reflectance measured at a substantially normal to the optical article is at least 70%.

Figure 8:
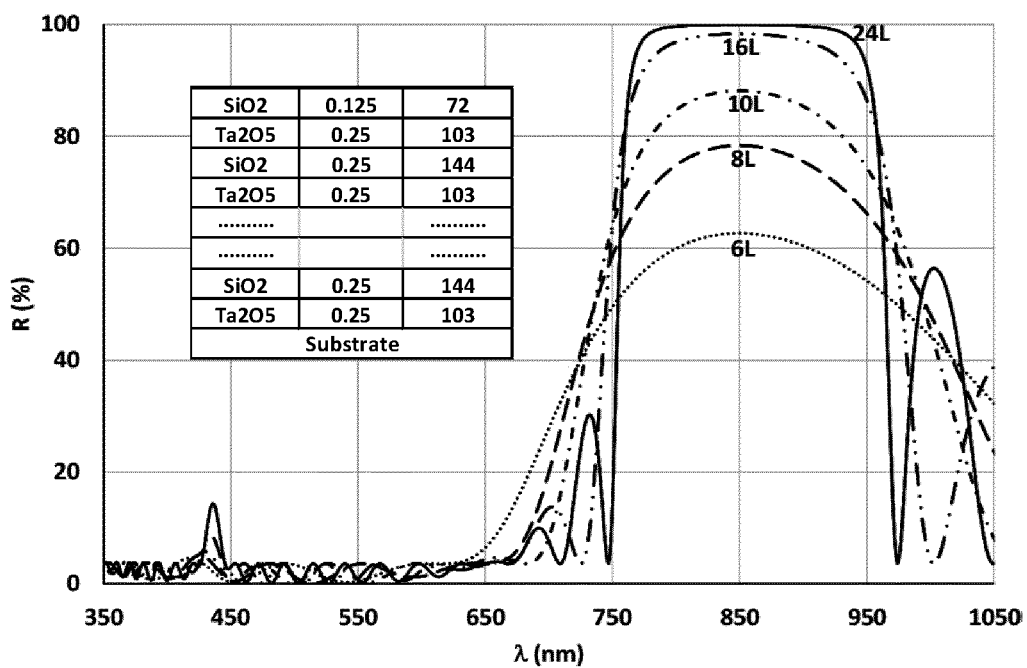

FIG. 8 shows another table with a layer configuration of an interferential coating optimized for 850 nm, the columns from left to right represent: material composition, optical thickness in wavelengths of 850 nm, and physical thickness in nanometers (nm). In FIG. 8, the interferential coating includes a stack of alternated $SiO_2$ as low refractive index layers and $Ta_2O_5$ layers as high refractive index layers. The optical thickness of each of the low refractive index layers and the high refractive index layers is 0.25. The physical thickness of each of the low refractive index layers is 144 nm, and the physical thickness of each of the high refractive index layers is 103 nm. The interferential coating further includes an outer low refractive index layer (first line of the table) of $SiO_2$ with optical thickness of 0.125 and physical thickness of 80 nm. FIG. 8 also shows reflectance plots as function of the wavelength for the interference coatings with a stack varying from 6 layers (6L), 8 layers, 10 layers, 16 layers, and 24 layers (24L). The number of layers increases from bottom up. As can be seen, with the exemplary configuration of FIG. 8, a stack of 8 or more layers provides a peak reflectance measured at a substantially normal to the optical article is at least 70%.

In summary, FIGS. 3 to 8 show a method to achieve high reflectance at 850 nm or at 940 nm with quarter-wavelength ($\lambda$/4) interferential coatings, which include multilayer optical materials, including at least one kind of low index material and one kind of high index material. The optical thickness of each layer is $\lambda$/4, where $\lambda$ is the center wavelength of the reflection band. In some embodiments a 10% variation may be acceptable. In the present disclosure, an outer low refractive index layer may be added to the interferential coating which may have an optical thickness of $\lambda$/8 instead of $\lambda$/4, in order to minimize the reflection in visible region. In order to have a reflectance of 70% or higher, is some embodiments, at least 8 layers of the stack are required, and as a consequence, the overall coating thickness is 920 nm (for the filters centered at 850 nm) or 1020 nm (for the filters centered at 940 nm). The substrate may be a mineral lens substrate, for example, if enhanced adhesion is desired.

Figure 9:
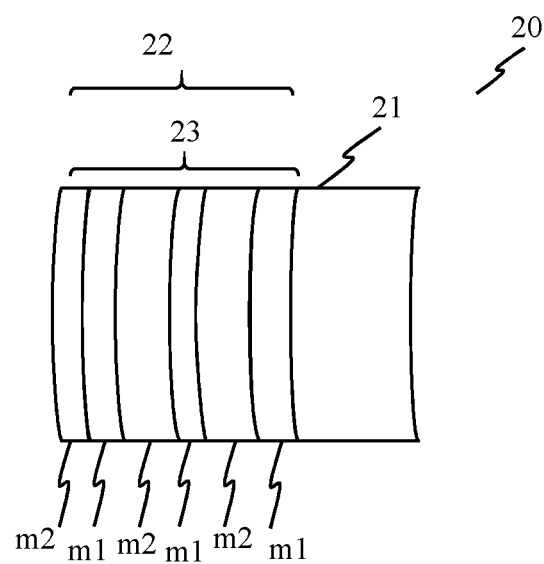
FIG. 9 shows details of an exemplary interferential coating 22 on a substrate 21, in accordance with some embodiments.

FIG. 9 shows an interferential coating 22 as described above, for example in connection with FIG. 2, with the exception that the low refractive index layers m1 may have different thicknesses from each other and the high refractive index layers m2 may have different thicknesses from each other. Furthermore, the low refractive index layers are not necessarily of a same material, and the high refractive index layers are not necessarily of a same material. The thicknesses of the layers may be determined, for example using a transfer matrix method. An example of the interferential coating 22 of FIG. 9 is an anti-reflection (AR) stack also named herein as anti-reflection interferential coating. In the example of FIG. 9, the interferential coating 22 is shown as including a stack 23 of 6 layers, however the disclosure is not limited thereto. With the optimized layer thicknesses, such a stack 23 is able to achieve the peak reflectance of at least 70% with less layers than the previous examples explained in connection with FIGS. 3 to 8. Meanwhile such a stack is able to achieve a mean light reflection factor in the visible region Rv is lower than or equal to 1.5% and optionally lower than or equal to 1%, which is unachievable for quarter-wavelength ($\lambda$/4) interferential coatings. The total thickness of such a stack 23 is less than 750 nm. The thickness of the outermost (furthest from the substrate) high index and low index bilayer m1+m2 is lower than 180 nm, while the thickness of the innermost (adjacent to the substrate) high index and low index bilayer m1+m2 is higher than 240 nm.

According to various embodiments, the ratio of a highest refractive index amongst the high refractive index layers to a lowest refractive index amongst the low refractive index layers may be greater than 1.30, for example greater than 1.40.

For stacks consisting of two kind of materials the index ratio may be determined as the ratio of the refractive index of m2 over the refractive index of m1. Two kind or materials may mean all low refractive index material layers having a same material and all high refractive index material layers having a same material. For stacks consisting of three or more materials, the index ratio may be determined as of the highest index over the lowest index. For example, in an 8 layer AR stacks consisting of $SiO_2$, $ZrO_2$, and $TiO_2$ layers, the index ratio is determined as the ratio of the refractive index of $TiO_2$ over the refractive index of $SiO_2$.

FIG. 10(a) shows a table with the material composition and layer thickness (in nm) of an interference coating in accordance with various embodiments. The interference coating comprises low refractive index layers of $SiO_2$ and high refractive index layers of $TiO_2$ alternately stacked on the substrate. The structure of the stack is optimized to exhibit a maximum reflection at 850 nm, and an anti-reflective behavior in visible light region. The total thickness of this example stack is 627 nm. The thickness of the outermost (furthest from the substrate) high index and low index bilayer is 154 nm, while the thickness of the innermost (adjacent to the substrate) high index and low index bilayer is 242 nm. The reflectance spectrum of the interference coating is shown in FIG. 10(b), it can be seen that a peak reflectance measured at a substantially normal to the optical article is greater than 70%. The table in FIG. 10(c) shows extracted parameters from the reflectance spectrum, in this case, the reflectance at 850 nm is 76.5% and at 940 nm is 72.7%. The mean light reflection factor in the visible region Rv equals to 0.82%.

FIG. 11(a) shows a table with the material composition and layer thickness (in nm) of an interference coating in accordance with various embodiments. The interference coating comprises low refractive index layers of $SiO_2$ and high refractive index layers of $Nb_2O_5$ alternately stacked on the substrate. The structure of the stack is optimized to exhibit a maximum reflection at 850 nm, and an anti-reflective behavior in visible light region. The total thickness of this example stack is 623 nm. The thickness of the outermost (furthest from the substrate) high index and low index bilayer is 153 nm, while the thickness of the innermost (adjacent to the substrate) high index and low index bilayer is 241 nm. The reflectance spectrum of the interference coating is shown in FIG. 11(b), it can be seen that a peak reflectance measured at a substantially normal to the optical article is greater than 70%. The table in FIG. 11(c) shows extracted parameters from the reflectance spectrum, in this case, the reflectance at 850 nm is 78.0% and at 940 nm is 74.6%. The mean light reflection factor in the visible region Rv equals to 0.84%.

FIG. 12(a) shows a table with the material composition and layer thicknesses (in nm) for 3 exemplary interference coatings ExA, ExB, ExC. The interference coatings comprise low refractive index layers of $SiO_2$ and high refractive index layers of $ZrO_2$ and $TiO_2$, stacked on a respective substrate. The total thickness of these example stacks is 636 nm, 658 nm, and 699 nm, respectively. The outermost (furthest from the substrate) and innermost (adjacent to the substrate) high-index layers in these example stacks consist of two high index materials ($ZrO_2$ and $TiO_2$). The thickness of the outermost doublet high index and low index bilayer is 149 nm, 157 nm, 165 nm respectively, while the thickness of the innermost doublet high index and low index bilayer is 258 nm, 267 nm and 290 nm, respectively. From the reflectance spectra shown in FIG. 12(b) it can be seen that the reflectance peak shifts to longer wavelengths from ExA to ExC, wherein ExA has a reflectance of 76.4% at 850 nm and 72.3% at 940 nm, ExB has a reflectance of 75.0% at 850 nm and 73.7% at 940 nm, and ExC has a reflectance of 70.5% at 850 nm and 74.1% at 940 nm. With the reflectance peak shifts to longer wavelengths from ExA to ExC, the mean light reflection factor in the visible region Rv is significantly reduced from 0.80% (ExA) down to 0.40%

(ExB) and further to 0.10% (ExC). It can be seen that a peak reflectance measured at a substantially normal to the optical article is greater than 70% for all 3 examples.

FIG. 13(a) shows a table with the material composition and layer thickness (in nm) of an interference coating in accordance with various embodiments. The interference coating comprises low refractive index layers of $SiO_2$ and high refractive index layers of $TiO_2$ alternately stacked on the substrate. The structure of the stack is optimized to exhibit a maximum reflection at 940 nm, and an anti-reflective behavior in visible light region. The total thickness of this example stack is 687 nm. The thickness of the outermost (furthest from the substrate) high index and low index bilayer is 166 nm, while the thickness of the innermost (adjacent to the substrate) high index and low index bilayer is 265 nm. The reflectance spectrum of the interference coating is shown in FIG. 13(b), it can be seen that a peak reflectance measured at a substantially normal to the optical article is greater than 70%. The table in FIG. 13(c) shows extracted parameters from the reflectance spectrum, in this case, the reflectance at 850 nm is 70.0% and at 940 nm is 76.5%. The mean light reflection factor in the visible region Rv equals to 0.81%.

FIG. 14(a) shows a table with the material composition and layer thickness (in nm) of an interference coating in accordance with various embodiments. The interference coating comprises low refractive index layers of $SiO_2$ and high refractive index layers of $Nb_2O_5$ alternately stacked on the substrate. The structure of the stack is optimized to exhibit a maximum reflection at 940 nm, and an anti-reflective behavior in visible light region. The total thickness of this example stack is 666 nm. The thickness of the outermost (furthest from the substrate) high index and low index bilayer is 160 nm, while the thickness of the innermost (adjacent to the substrate) high index and low index bilayer is 259 nm. The reflectance spectrum of the interference coating is shown in FIG. 14(b), it can be seen that a peak reflectance measured at a substantially normal to the optical article is greater than 70%. The table in FIG. 14(c) shows extracted parameters from the reflectance spectrum, in this case, the reflectance at 850 nm is 74.6% and at 940 nm is 78.3%. The mean light reflection factor in the visible region Rv equals to 0.85%.

FIG. 15(a) shows a table with the material composition and layer thicknesses (in nm) for 3 exemplary interference coatings ExD, ExE, ExF. The interference coatings comprise low refractive index layers of $SiO_2$ and high refractive index layers of $ZrO_2$ and $TiO_2$, stacked on a respective substrate. The total thickness of these example stacks is 682 nm, 705 nm, and 713 nm, respectively. The outermost (furthest from the substrate) and innermost (adjacent to the substrate) high-index layers in these example stacks consist of two high index materials ($ZrO_2$ and $TiO_2$). The thickness of the outermost doublet high index and low index bilayer is 162 nm, 154 nm, 165 nm respectively, while the thickness of the innermost doublet high index and low index bilayer is 271 nm, 296 nm and 298 nm, respectively. From the reflectance spectra shown in FIG. 15(b) it can be seen that all 3 reflectance spectra are similar, wherein ExD has a reflectance of 71.9% at 850 nm and 76.7% at 940 nm, ExE has a reflectance of 69.1% at 850 nm and 75.2% at 940 nm, and ExF has a reflectance of 68.4% at 850 nm and 74.4% at 940 nm. With the reflectance peak shifts to longer wavelengths from ExD to ExF, the mean light reflection factor in the visible region Rv is significantly reduced from 0.80% (ExD) down to 0.40% (ExE) and further to 0.10% (ExF). It can be seen that a peak reflectance measured at a substantially normal to the optical article is greater than 70% at 940 nm for all 3 examples.

Figure 10:
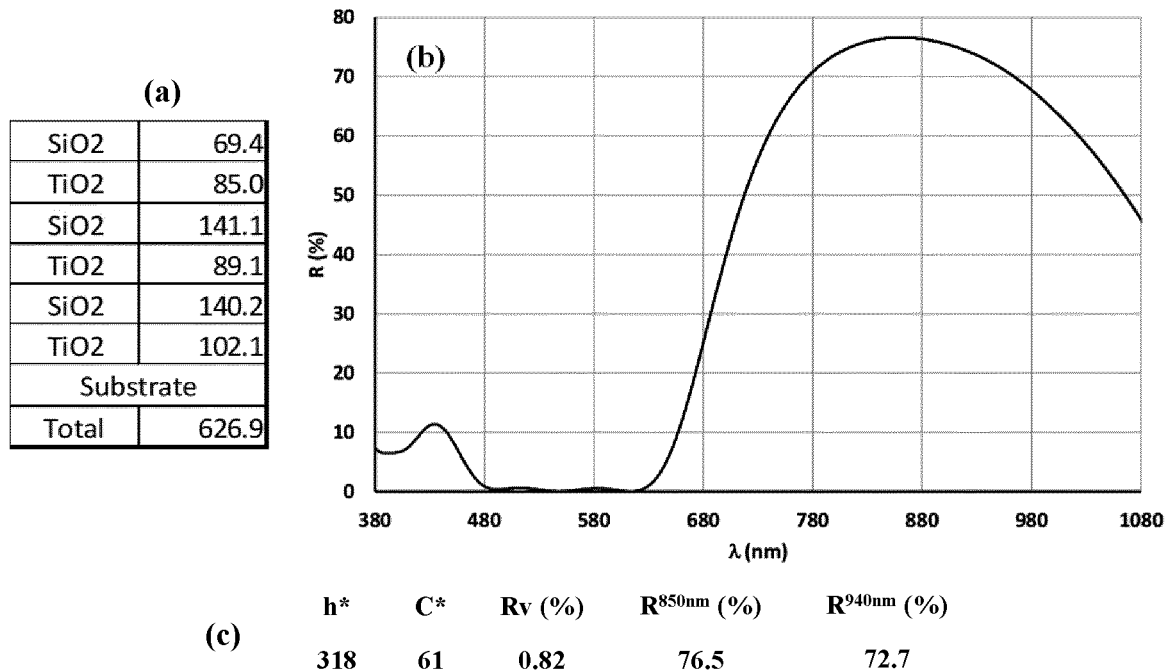
FIGS. 10 to 15 show examples of interferential coatings according to some embodiments including anti-reflection interferential coatings.
Figure 11:
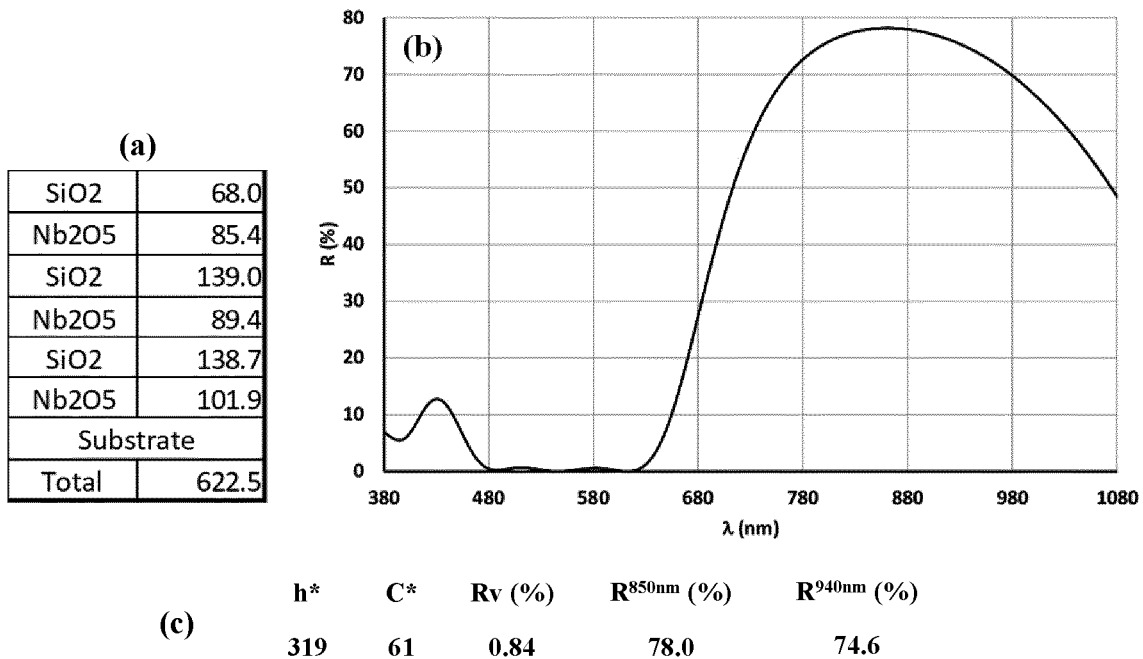
Figure 12:
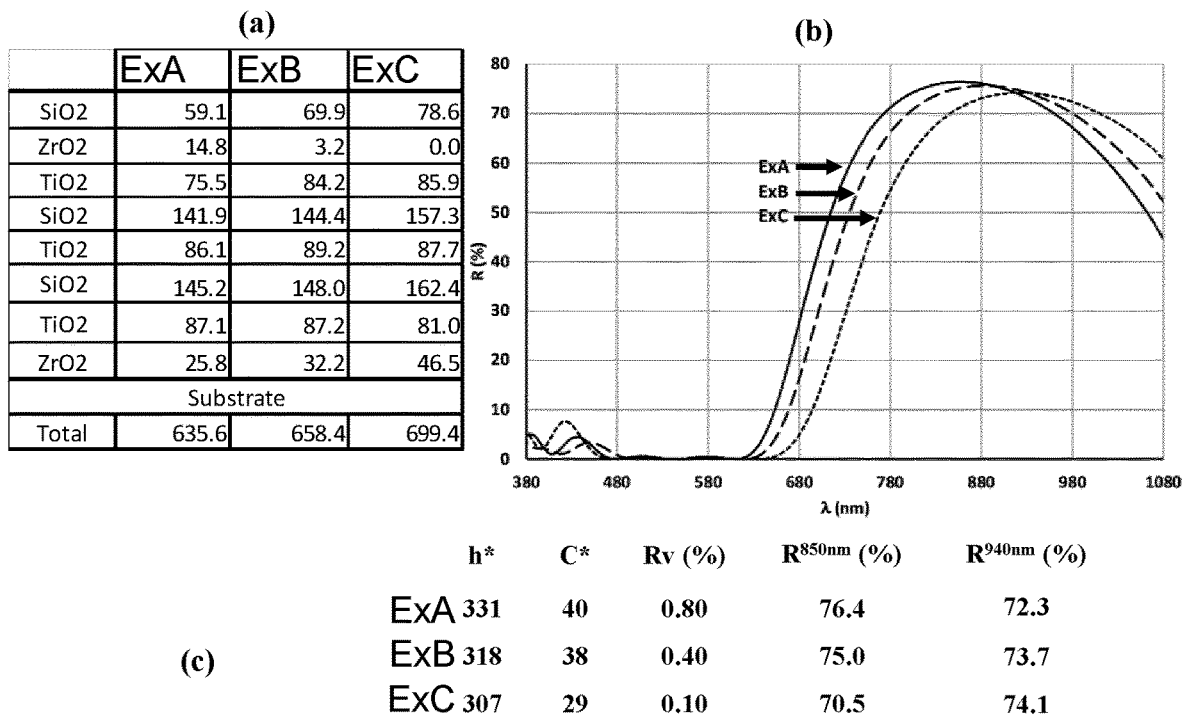
Figure 13:
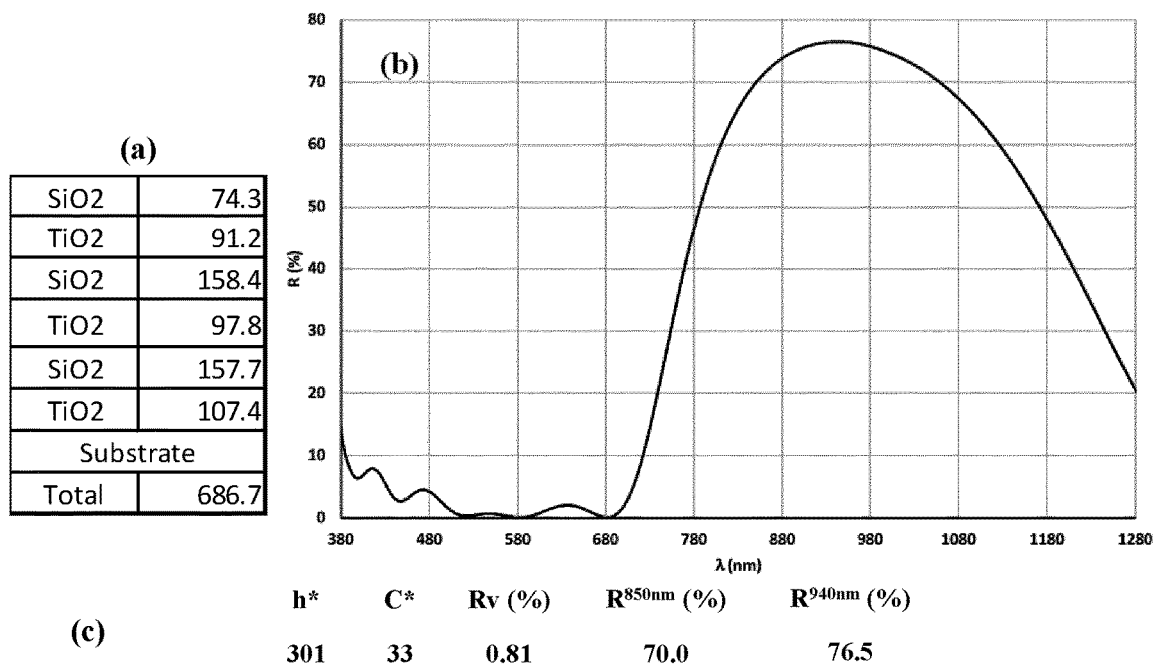
Figure 14:
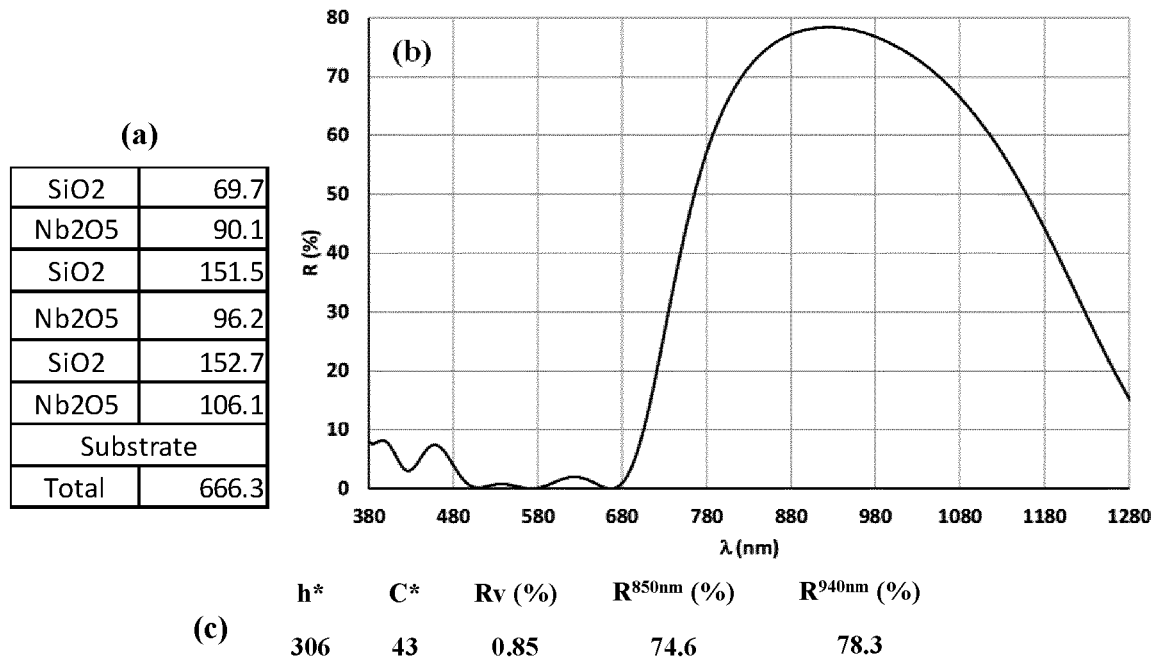
Figure 15:
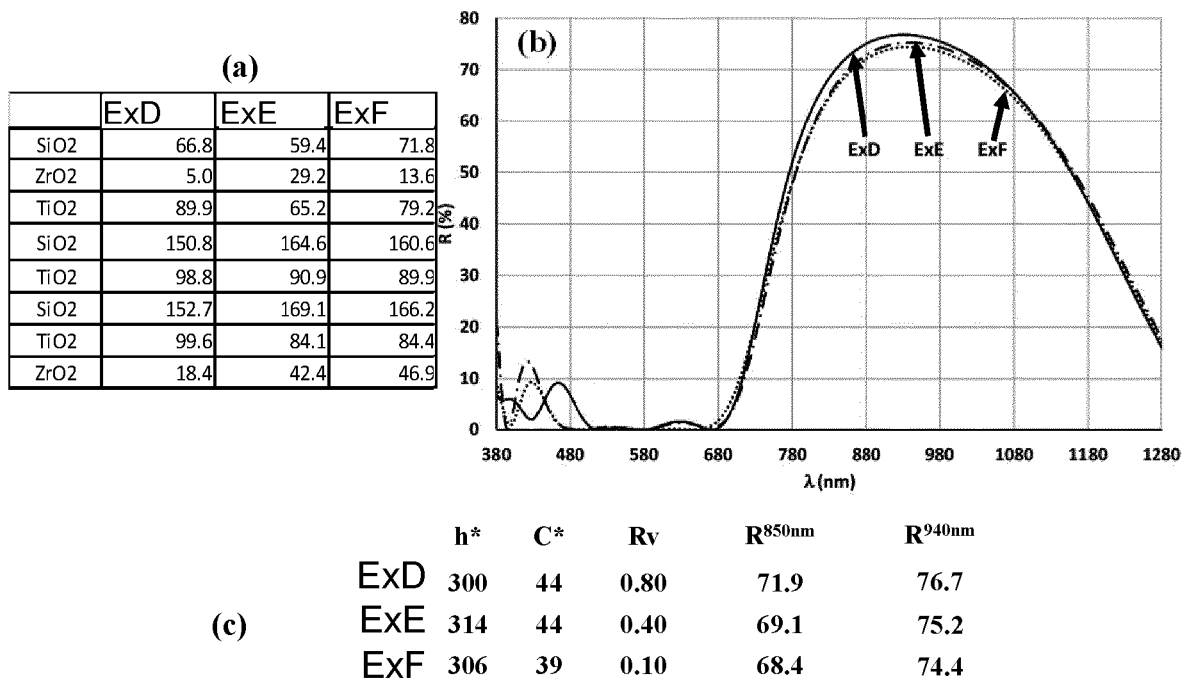

In summary, FIGS. 10 to 12 show some example AR stacks with maximum reflectance around 850 nm. Similarly, FIGS. 13 to 15 show some example AR stacks with maximum reflectance at 940 nm. The layer structure and major optical properties, including reflectance at 850 nm and 940 nm, of these AR stacks are also shown in these figures. Besides the high reflectance at 850 nm and/or 940 nm, all these stacks have a low Rv (equal or smaller than 0.85%). For the specific 8-layer ZTiQTiQTiZQ stacks (e.g. examples of ExC in FIG. 12 and ExF in FIG. 15), an extreme low Rv (~0.1%) can be achieved. For some of these stacks, the reflectance at 850 nm or 940 nm is higher than 70%. Even if only one surface of the lenses is coated with such coatings, reflectance at the targeted wavelength (850 nm or 940 nm) is higher than 70%. If both surfaces are coated with such coatings more than 80% reflectance can be achieved. The TaQTaQ stacks have a reflectance>63% at 850 nm or 940 nm, if both surfaces are coated with such coatings, a total reflectance higher than 70% can be achieved.

According to some embodiments, the interferential coating may have a thickness of equal to or less than 750 nm, for example of equal to or less than 710 nm, and for example of equal to or less than 650 nm. Such thicknesses ensure mechanical reliability of the interferential coating. According to some embodiments, the thickness of the outermost (furthest from the substrate) high index and low index bilayer of the interferential coating may be lower than 180 nm, for example of equal to or less than 170 nm, and for example of equal to or less than 165 nm. According to some embodiments, the thickness of the innermost (adjacent to the substrate) high index and low index bilayer m1+m2 may be higher than 240 nm, for example of equal to or higher than 250 nm, and for example of equal to or higher than 260 nm.

User wearable optical articles according to various embodiments have an increased reflectance in the near infra-red spectrum, which is not visible to the human eye. The interferential coating may be used for example, to identify the presence of the user wearable optical article proximal to a sensor. For example, due to the interferential coating, the reflection of a NIR signal reflected by the user wearable optical article may be enhanced. In one exemplary application, the user wearable optical article may be used in connection with a digital screen (e.g. for reading), for example of a mobile phone, a distance sensor may indicate the distance between the screen and the user wearable optical article, and therefore the distance between the digital screen and user's eye(s). Such distance may be used to alert the user that his reading distance is not within an optimal or healthy range.

Today, most digital multi-function devices (e.g., smartphones, tablets) already have their built-in proximity sensors. Such proximity sensors emit infrared light (for example at 850 nm or 940 nm) and by measuring the reflected infrared light from an object, the distance between the proximity sensor and the object can be determined. The most common use of this function is to determine whether a phone is placed near the user's ear during a phone call. In this situation, the proximity sensor may activate a background application which will turn off the digital screen in order to avoid undesirable operations from accidental touch on the screen. Such a combination of built-in proximity sensors and background application in today's mainstream digital devices will turn off the screen at a distance range of two centimeters or less.

The interferential coating in accordance with various embodiments has a strong reflection level at the working wavelength of the proximity sensor. This strong reflection may trigger the proximity sensor at a longer distance than current defined distance of two centimeters (or less).

A set of tests was carried out with optical articles in accordance with the present disclosure, including the above examples, using commercially available smartphones. The operating wavelength was 940 nm. For a same smartphone the distance to the optical article under which the screen is turned off was 6.19 cm, which is a significant more than the distance of 4.97 cm for a comparative example without the interferential coating. For a second phone, the distance to the optical article under which the screen is turned off was 6.90 cm, which is a significant more than the distance of 3.93 cm for a comparative example without the interferential coating. For a third phone, the distance to the optical article under which the screen is turned off was 11.15 cm, which is a significant more than the distance of 7.18 cm for a comparative example without the interferential coating. Other comparative examples using a hand in front of the smartphone have further halved the distance.

This longer distance to activate the background application to cut off digital screen can be used to control reading distance: when the reading distance is far enough, the digital screen will remain on, while the reading distance becomes shorter and the reflected infrared light triggers the proximity sensor, the screen will be turned off automatically without any intervention. A user just need to move the digital device further away, and the screen will be turned on again automatically. In some embodiments, no specific additional hardware (using existing built-in proximity sensors) is required. In other embodiments, for example, traditional display devices without such built-in proximity sensors, e.g. traditional TV, an additional NIR distance sensor, for example an external distance sensor, could added. Further, according to various embodiments, only a simple background software application may be required to turn off screen.

Figure 16:
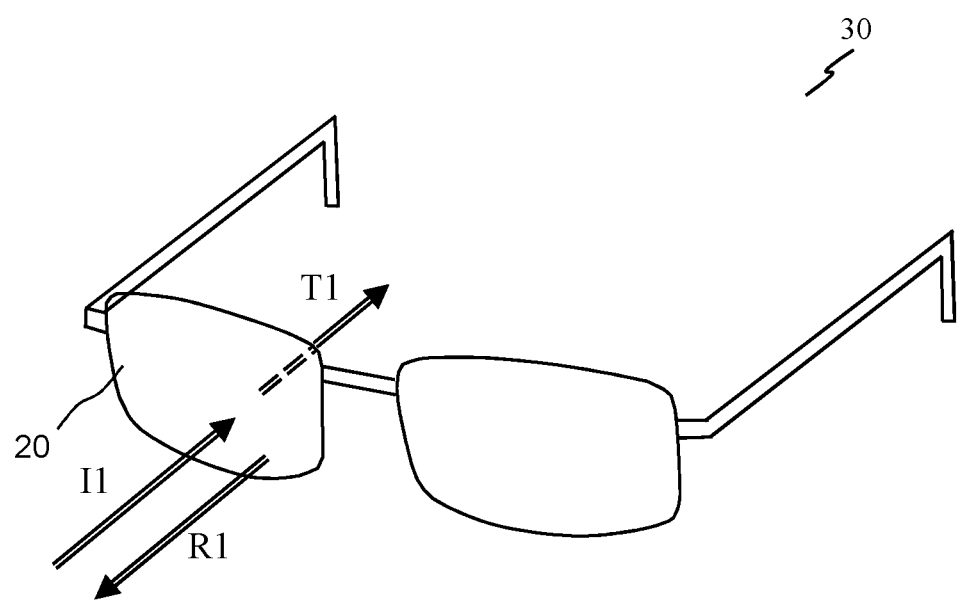
FIG. 16 shows a schematic illustration of a spectacles including a user wearable optical article in accordance with various embodiments.

FIG. 16 shows an eyewear 30, illustrated as a spectacle, including an optical article 20, in accordance with various embodiments. The eyewear may include an optical articles as described herein.

The disclosure also concerns a method for producing an optical article as described in accordance with various embodiments. The method may include providing the optical substrate. The method may further include providing the interferential coating disposed on at least one of the front main face and rear main face of the optical substrate. The interferential coating may be deposited, for example, via vacuum deposition or another suitable method for deposition of optical films, such as magnetron sputtering.

According to various embodiments the method may further include obtaining a product model designation of a multi-purpose mobile computing device (for example a smartphone) including an infrared proximity sensor. The method may further include obtaining from a pre-populated database (e.g. a look-up table) an operating wavelength of the infrared proximity sensor, or a value derived thereof. For example, given a smartphone model number or product code, the operating wavelength of the infrared proximity sensor may be obtained from the pre-populated database. For example, the operating wavelength may be 940 nm. In the method, the providing the interferential coating may include providing the at least one range of wavelengths of incident light in the near infrared light spectrum to overlap with the operating wavelength of the infrared proximity sensor.

The invention claimed is:

1. A user wearable optical article comprising:
   an optical substrate with a front main face and a rear main face for facing the user when wearing the optical article; and
   an interferential coating disposed on at least one of the front main face and rear main face and configured to selectively reflect light of at least one range of wavelengths of an incident light in the near infrared light spectrum, so that a peak reflectance at 850 nm or 940 nm measured at a substantially normal to the optical article is at least 70%, and the interferential coating has a mean reflectance of less than 1.5% in a visible light range,
   wherein the total thickness of the interferential coating is equal to or less than 750 nm.

2. The optical article of claim 1, wherein the interferential coating comprises at least two low refractive index layers and at least two high refractive index layers in an alternating sequence, wherein the low refractive index layers have a refractive index lower than 1.60 and the high refractive index layers have a refractive index higher than 1.80.

3. The optical article of claim 2, wherein the ratio of a highest refractive index amongst refractive indexes of the layers of high refractive index material to a lowest refractive index amongst refractive indexes of the layers of low refractive index material is greater than 1.30.

4. The optical article of claim 2, wherein the at least two low refractive index layers have different thickness from each other, and the at least two high refractive index layers have different thickness from each other.

5. The optical article of claim 2, wherein the thickness of the outermost bilayers furthest from the optical substrate is lower than 180 nm, said outermost bilayers comprising a low refractive index layer and one or two high refractive index layer.

6. The optical article of claim 2, wherein the thickness of the innermost bilayers adjacent to the optical substrate is higher than 240 nm, said innermost bilayers comprising a low refractive index layer and one or two high refractive index layer.

7. The optical article of claim 1, wherein the reflectance of the interferential coating at 850 nm and/or a reflectance of the interferential coating at 940 nm is at least 80%.

8. The optical article of claim 1, wherein the near infrared reflection spectrum has a bandwidth in a range from longer than 780 nm to equal or shorter than 1400 nm.

9. The optical article of claim 1, wherein the peak reflectance of the optical filter is at 850 nm+/−10 nm or at 940 nm+/−10 nm.

10. The optical article of claim 1, selected from the group of: spectacle lens, sunglasses lens, contact lens, optical lens of a head mounted device, optical lens of an augmented reality device, optical lens of a virtual reality device.

11. A method for the prevention or treatment of asthenopia and/or myopia in a patient in need thereof, comprising providing eyewear comprising the optical article of claim 1, and having the patient wear the optical article.

12. An eyewear comprising an optical article according to claim 1.

13. A method for producing an optical article according to claim 1, comprising:
   providing the optical substrate; and
   providing the interferential coating disposed on at least one of the front main face and rear main face of the optical substrate, and configured to selectively reflect light of at least one range of wavelengths of an incident light in the near infrared light spectrum, so that a peak reflectance measured at 850 nm or 940 nm at a substantially normal to the optical substrate is at least 70%, and the interferential coating has a mean reflectance of less than 1.5% in a visible light range.

14. The method of claim 13, further comprising:
   obtaining a product model designation of a multi-purpose mobile computing device comprising an infrared proximity sensor, and
   obtaining from a pre-populated database an operating wavelength of the infrared proximity sensor, or a value derived thereof, and
   wherein providing the interferential coating comprises providing the at least one range of wavelengths of incident light in the near infrared light spectrum to overlap with the operating wavelength of the infrared proximity sensor.

15. The optical article of claim 1, wherein the total thickness of the interferential coating is equal to or less than 710 nm.

16. The optical article of claim 1, wherein the total thickness of the interferential coating is equal to or less than 650 nm.

17. The optical article of claim 2, wherein the ratio of a highest refractive index amongst refractive indexes of the layers of high refractive index material to a lowest refractive index amongst refractive indexes of the layers of low refractive index material is greater than 1.40.

18. The optical article of claim 1, wherein the near infrared reflection spectrum has a bandwidth in a range from longer than 780 nm to equal or shorter than 1100 nm.

19. The optical article of claim 1, wherein the near infrared reflection spectrum has a bandwidth in a range from 800 nm to 1000 nm.

* * * * *